United States Patent [19]

Becker

[11] Patent Number: 5,566,918
[45] Date of Patent: Oct. 22, 1996

[54] ANGLED DOOR ROLLER

[75] Inventor: Kent Becker, Rome City, Ind.

[73] Assignee: The Dometic Corporation, LaGrange, Ind.

[21] Appl. No.: 276,530

[22] Filed: Jul. 18, 1994

[51] Int. Cl.$^6$ ...................................................... A47F 5/00
[52] U.S. Cl. ........................... 248/351; 248/251; 160/45; 160/67; 296/163
[58] Field of Search .................................. 248/351, 251; 160/65, 67, 72, 66, 45; 135/88.1, 88.11, 88.12; 296/163, 156, 152; 52/74

[56] References Cited

U.S. PATENT DOCUMENTS

| 3,918,510 | 11/1975 | Hayward | 160/45 |
|---|---|---|---|
| 4,117,876 | 10/1978 | Bennett | 160/67 |
| 4,640,332 | 2/1987 | Turner | 160/65 |
| 4,719,954 | 1/1988 | Curtis et al. | 160/67 |
| 4,727,897 | 3/1988 | Watts | 135/88.1 |
| 5,280,687 | 1/1994 | Boiteau | 296/163 |
| 5,423,506 | 6/1995 | Spoon | 160/67 |

FOREIGN PATENT DOCUMENTS

| 1510655 | 12/1967 | France | 160/45 |
|---|---|---|---|

*Primary Examiner*—Leslie Braun
*Assistant Examiner*—Anita M. King
*Attorney, Agent, or Firm*—Pearne, Gordon, McCoy & Granger

[57] ABSTRACT

A roller assembly is provided for mounting on a vehicle having a door and an awning mounted adjacent the door. The door has a generally-rectangularly shaped face and edging along edges of the face. The roller assembly comprises a roller and a bracket having a mounting portion with a substantially planar surface for abutting the face of the door and a supporting portion for rotatably supporting the roller angularly intersecting the mounting portion. The bracket is adapted for positioning the axis of rotation of the roller generally horizontal and above the edging near a top corner of the door. The supporting portion is adapted to position the axis of rotation of the roller to intersect an axis of rotation of the door.

12 Claims, 2 Drawing Sheets

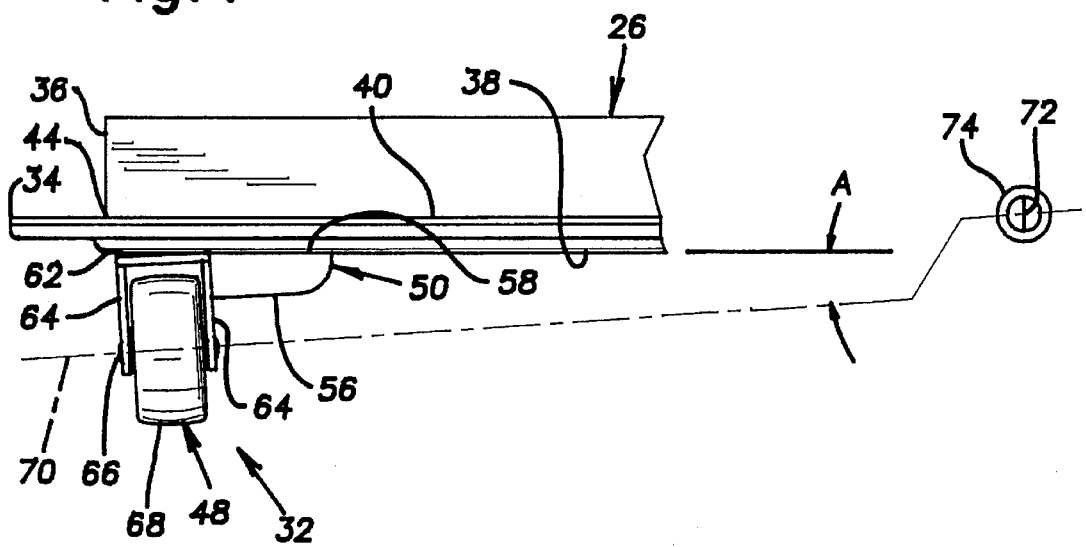
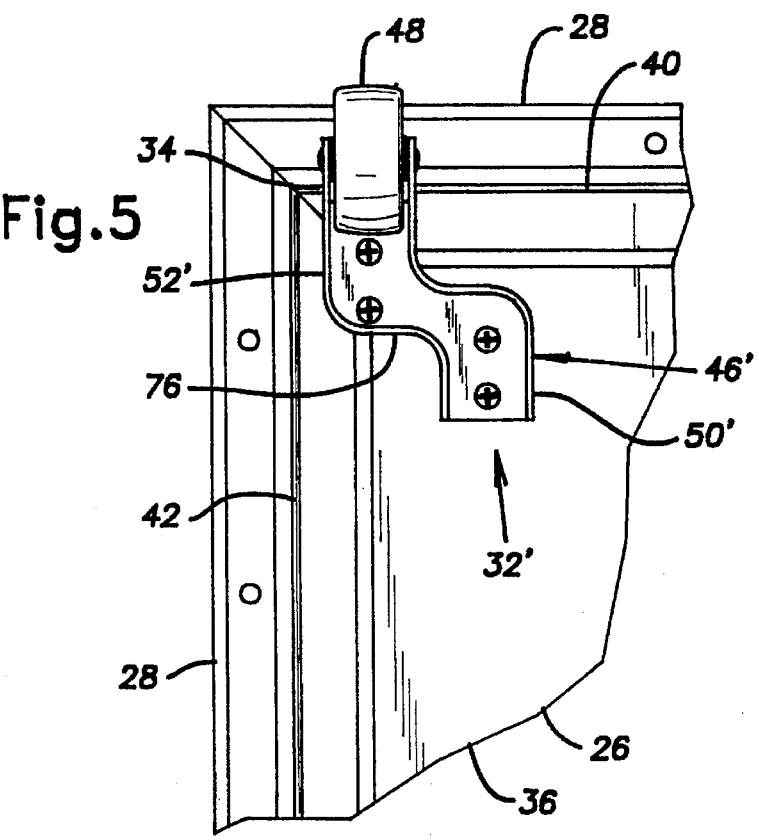

ANGLED DOOR ROLLER

BACKGROUND OF THE INVENTION

1. Field of the Invention

The present invention generally relates to door rollers, and more specifically to door rollers for recreational vehicles having a retractable awning.

2. Description of Retailed Art

A retractable awning is often attached to the side of a recreational vehicle, such as a travel trailer or mobile home. The awning is retractable to a stored position adjacent the side of the recreational vehicle during transportation and can be moved from the stored position to an extended position. When in the extended position, a canopy of the awning can provide protection from the sun or rain.

It is often convenient to attach the awning adjacent a door in the side of the recreational vehicle. However, when the door is opened the top of the door can contact the awning canopy and cause damage. Note that a relatively high door and low roof where the awning is mounted prevents the awning from being mounted further above the door. The contact between the door and awning can cause damage to both the door and the awning canopy. Commonly the canopy is scratched, snagged, or torn. To prevent the damage a roller of standard design is mounted at the top of the door. When the door is opened the roller lifts the canopy so that the door does not engage the canopy.

The roller, however, often cannot be positioned near the top corner of the door to prevent the damage. The door often has thin aluminum edging strips along edges of the door and the roller cannot be mounted on the edging strips because the strips will not support the roller and the canopy. Therefore, the roller must be mounted to the main body of the door down from the edging strip at the top of the door and in from the edging strip at the side of the door. Due to the width of the edging strips, the roller is not in a position near the top corner of the door to always lift the canopy and prevent the top corner of the door from contacting the canopy, particularly when the canopy is steeply sloped or heavy.

Additionally, as the door is opened the roller partially skids across the canopy rather than rolling. The skidding can cause additional resistance in opening the door and cause wearing of the canopy in the contact area. Therefore, there is a need in the art for an improved door roller to better protect the awning.

SUMMARY OF THE INVENTION

The present invention provides a door roller which solves the above-noted problems found in the prior art door rollers. The door roller assembly is provided for mounting on a vehicle having a door and an awning mounted adjacent the door. The door has a generally-rectangularly shaped face and edging along edges of the face. The roller assembly includes a roller and a bracket having a mounting portion with a substantially planar surface for abutting the face of the door and a supporting portion for rotatably supporting the roller and connected to the mounting portion. The bracket is adapted for positioning the roller substantially above the edging at a top edge of the door and substantially above the edging at the side of the door. Therefore, the bracket is attached to the door and sufficiently extends over the door edging to position the roller.

In accordance with a preferred embodiment of the present invention, the bracket is adapted to position the axis of rotation of the roller to intersect an axis of rotation of the door. Therefore, the roller rolls along an arc about the rotational axis of the door to minimize skidding of the roller on the awning.

BRIEF DESCRIPTION OF THE DRAWINGS

These and further features of the present invention will be apparent with reference to the following description and drawings, wherein:

FIG. 4 is a fragmentary plan view of the recreational vehicle door of FIG. 1 at the roller assembly and removed from the door frame for clarity; and FIG. 5 is a fragmentary front elevational view of the recreational vehicle door with a second embodiment of the roller assembly.

DETAILED DESCRIPTION OF THE PREFERRED EMBODIMENT

Figure 1:
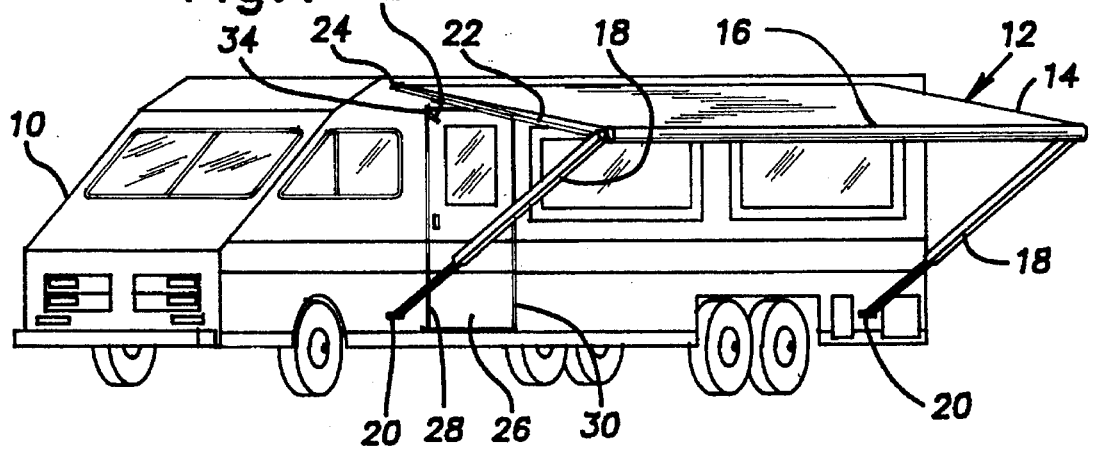
FIG. 1 is a perspective view of a recreational vehicle having a door, an awning, and a roller assembly according to the present invention.

Referring to FIG. 1, there is illustrated a recreational vehicle 10 having a retractable awning 12. The awning 12 is mounted to the side of the recreational vehicle 10 and is movable between an extended position (shown in FIG. 1) and a stored position adjacent the side of the recreational vehicle 10. The awning 12 includes a canopy 14 that extends outwardly and generally downwardly from the side of the vehicle 10 when the awning 12 is in the extended position and is rolled onto a roller tube 16 when the awning is retracted to the stored position. The awning 12 also includes a pair of support arms 18 that each have an upper end rotatably supporting the roller tube 16 and a lower end pivotably connected to a lower bracket 20 mounted on the side of the recreational vehicle 10. A pair of tension rafters 22 each have an upper end pivotably connected to an upper bracket 24 mounted on the side of the recreational vehicle 10 and a lower end slidably connected to an associated one of the support arms 18.

The recreational vehicle 10 also includes a rectangularly-shaped door 26 hingedly mounted within a door frame 28 in the side of the recreational vehicle 10. The door 26 pivots about a hinged side 30 to outwardly open and inwardly close as is conventional. The awning 12 is positioned adjacently above the door 26 so that when the awning 12 is in the extended position the canopy 14 extends outwardly over the door 26. A roller assembly 32 is mounted to the door 26 near a top corner 34 of the door 26 opposite the hinged side 30.

Figure 2:
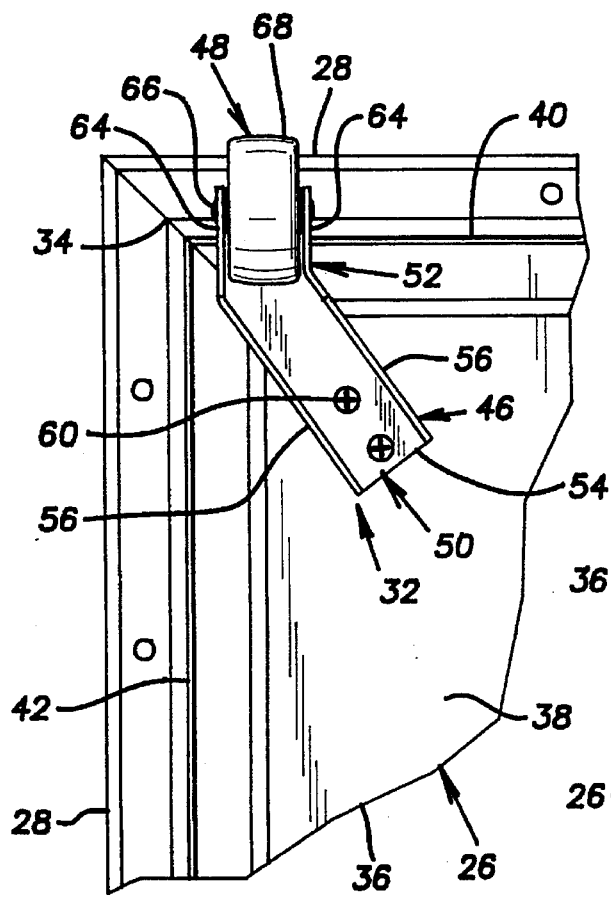
FIG. 2 is a fragmentary front elevational view of the recreational vehicle door of FIG. 1 at the roller assembly.
Figure 3:
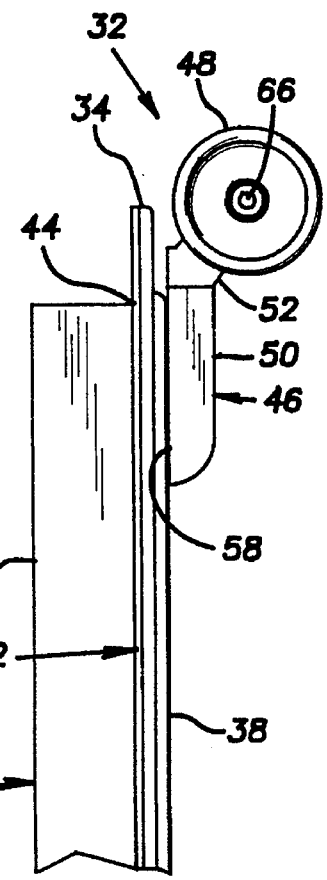
FIG. 3 is a fragmentary side elevational view of the recreational vehicle door of FIG. 1 at the roller assembly removed from the door frame for clarity.

As best seen in FIGS. 2–4, the door 26 has a main body 36 with a generally planar outer surface or face 38. Extending outwardly from the periphery of the door 26 generally at the outer surface 38 are edging strips 40, 42. The edging strips 40, 42 have a thickness substantially less than the thickness of the main body 36. The edging strips 40, 42 cooperate with the door frame 28 to seal the interface between the door 26 and door frame 28 as is conventional. The edging strip 40 at the top of the door 26 and the edging strip 42 at the side of the door 26 form the top corner 34 of the door 26 that is above and outward of a top corner 44 of the door main body 36.

The roller assembly 32 includes a bracket 46 and a roller 48. The bracket 46 is preferably made from galvanized steel having a thickness of approximately 0.085 inches. The bracket 46 includes a mounting portion 50 and a supporting portion 52. The mounting portion 50 is generally U-shaped in cross-section having a generally rectangularly-shaped base 54 and two flanges 56 outwardly extending from the longitudinal sides of the base 54. The base 54 has a substantially planar mounting surface 58 on a side opposite the flanges 56. Two openings are provided in the base 54 for fasteners 60 to attach the bracket 46 to the door main body 36.

The supporting portion 52 is also generally U-shaped in cross-section and has a base 62 and two flanges 64 upwardly and outwardly extending from the sides of the base 62. The supporting portion 52 angularly intersects the mounting portion 50, preferably at an angle of approximately 36 degrees. The base 54 of the mounting portion 50 is integral with the base 62 of the supporting portion 52 and the flanges 56 of the mounting portion 50 are integral with the flanges 64 of the supporting portion 52.

The flanges 64 of the supporting portion 52 are adapted for supporting the roller 48. Each flange 64 is provided with an opening for a support pin or axle 66. The support pin 66 is preferably a semi-tubular rivet of zinc plated steel. The support pin 66 extends through the openings of the flanges 64 and is retained within the openings of the flanges 64 at its ends.

The roller 48 is preferably made of polypropylene. The roller 48 has an outer diameter forming an outer rolling surface 68 and a central opening about an axis of rotation 70. The roller 48 is positioned between the flanges 64 of the bracket support portion 52 with the support pin 66 extending through the central opening such that the roller 48 is free to rotate about the axis of rotation 70. Preferably the roller 48 outwardly extends, perpendicular to the outer surface 38 of the door main body 36, a minimum distance so that the door 26 can be fully opened (best seen in FIG. 3).

As best seen in FIG. 4, the flanges 64 of the bracket support portion 52 preferably form an angle with respect to the mounting surface 58 of the bracket mounting portion 50. The flanges 64 are angled so that the axis of rotation 70 of the roller 48 generally intersects the axis of rotation 72 of the door hinges 74.

The roller assembly 32 is mounted to the door 26 at the top corner 34 of the door 26. The mounting surface 58 of the mounting portion base 54 abuts the outer surface 38 of the door main body 36 and the fasteners 60 extend through the openings of the base 54 and into the door main body 36 to attach the bracket 46 to the door 26. The bracket 46 is positioned so that the supporting portion 52 extends over the top edging strip 40. As seen in FIG. 2, the roller 48 is positioned substantially above the edging strip 40 at the top of the door 26 with the axis of rotation 70 generally horizontal. Preferably, the axis of rotation 70 of the roller 48 is above the edging strip 40 at the top of the door 26 so that more than half of the roller 48 extends above the edging strip 40. This permits the use of a small diameter roller to obtain an adequate clearance between the door and the awning and allow the door to be fully opened.

As seen in FIG. 2, the roller 48 is also positioned laterally outwardly from the door main body 36 so that the roller 48 is generally aligned above the edging strip 42 at the side of the door 26. In this position the roller 48 is substantially above the edging near the top corner 34 of the door 26, that is, the corner formed by the edging strips 40, 42.

A second embodiment of a roller assembly 32' is shown in FIG. 5. The roller assembly 32' has a bracket 46' with a mounting portion 50' and a supporting portion 52' that are generally as described above for the first embodiment. However, the mounting portion 50' and the supporting portion 52' are generally parallel and laterally offset. The mounting portion 50' and the supporting portion 52' are connected by a connecting portion 76. Oriented in this manner, the bracket 46' is attached to the door main body 36 and positions the roller 48 as described above for the first embodiment.

The awning canopy 14 extends outwardly from the side of the recreational vehicle 10 when the awning 12 is in the extended position and can be adjusted to downwardly slope away from the side of the recreational vehicle 10. In this position the canopy 14 partially blocks the path of the door 26 during opening. The roller assembly 32 is firmly mounted to the sturdy main body 36 of the door 26 and positions the roller 48 substantially above the edging strips 40, 42 at the top corner 34 of the door 26. When the door 26 is opened the roller 48 engages the canopy 14 and lifts the canopy 14 away from the top corner 34 of the door 26. The roller 48 supports the canopy 14 to prevent interference with the door 26 and thereby prevents ripping of the canopy 14 and bending of the top corner 34 of the door 26. The roller 48 rotates and the rolling surface 68 of the roller 48 travels across the canopy 14 as the door 26 is rotated about the door hinges 74. The angle of the roller 48 relative to the mounting surface 58 of the bracket 46 reduces skidding of the roller 48 on the canopy 14 and thereby eases opening of the door 26 and reduces wear of the canopy 14 at the contact area.

Although particular embodiments of the invention have been described in detail, it will be understood that the invention is not limited correspondingly in scope, but includes all changes and modifications coming within the spirit and terms of the claims appended hereto.

What is claimed is:

1. A door assembly for hingedly mounting on a recreational vehicle and below a canopy, said door assembly comprising a generally-rectangularly shaped body, edging strips along edges of said body, and a roller assembly having a roller and a bracket, said bracket having a mounting portion mounted to said body and a supporting portion rotatably supporting said roller and connected to said mounting portion, wherein said bracket positions said roller substantially above said edging strips near a top corner of said door assembly, whereby said roller assembly is adapted to support the canopy when said door assembly is opened to prevent interference between the door assembly and the canopy.

2. The door assembly as set forth in claim 1, wherein said bracket is adapted to generally horizontally position an axis of rotation of said roller above said edging strips.

3. The door assembly as set forth in claim 1, wherein said mounting portion angularly intersects said supporting portion to position at least a portion of said roller laterally outward a side of said body.

4. The door assembly as set forth in claim 1, wherein said mounting portion is laterally offset from said supporting portion to position at least a portion of said roller laterally outward a side of said body.

5. The door assembly as set forth in claim 1, wherein the supporting portion is adapted to position an axis of rotation of said roller to intersect an axis of rotation of said door assembly.

6. The door assembly as set forth in claim 1, wherein said bracket is adapted to position at least a portion of said roller laterally outward a side of said body.

7. A recreational vehicle comprising a door having a generally rectangularly-shaped face and edging outwardly extending along edges of said face, a retractable awning mounted adjacent said door, and a roller assembly having a roller and a bracket, said bracket having a mounting portion fixed to said face of said door and a supporting portion connected to said mounting portion and rotatably supporting said roller substantially above said edging at a top edge of said door to support the awning to clear the door.

8. The recreational vehicle as set forth in claim 7, wherein an axis of rotation of said roller is generally horizontal and above said edging at said top edge of said door.

9. The recreational vehicle as set forth in claim 7, wherein said mounting portion angularly intersects said supporting portion to position at least a portion of said roller laterally outward a side of said face.

10. The recreational vehicle as set forth in claim 7, wherein said mounting portion is laterally offset from said supporting portion to position at least a portion of said roller laterally outward a side of said face.

11. The recreational as set forth in claim 7, wherein an axis of rotation of said roller intersects an axis of rotation of said door.

12. The recreational vehicle as set forth in claim 7, wherein said bracket is adapted to position at least a portion of said roller laterally outward a side of said face.

* * * * *